United States Patent
Bühring et al.

(10) Patent No.: US 7,534,318 B2
(45) Date of Patent: May 19, 2009

(54) METHOD OF PRODUCING TEXTURED MOLD-FORMED BODIES, AND MOLD-FORMED BODIES MANUFACTURED ACCORDING TO THE METHOD

(75) Inventors: Jürgen Bühring, Göppingen (DE); Volker J. Hülsewede, Göppingen (DE); Rainer Ohlinger, Hannover (DE); Burkhard Schäfer, Hannover (DE)

(73) Assignee: Benecke-Kaliko AG

( * ) Notice: Subject to any disclaimer, the term of this patent is extended or adjusted under 35 U.S.C. 154(b) by 486 days.

(21) Appl. No.: 10/998,356

(22) Filed: Nov. 24, 2004

(65) Prior Publication Data

US 2005/0173047 A1    Aug. 11, 2005

(30) Foreign Application Priority Data

Dec. 4, 2003    (DE) .............. 103 56 665.1

(51) Int. Cl.
*B29C 65/00* (2006.01)
*B29C 65/16* (2006.01)
*B29C 59/00* (2006.01)

(52) U.S. Cl. ............ 156/196; 156/220; 264/291; 264/293; 264/479; 264/489

(58) Field of Classification Search ............... 156/220, 156/196; 264/291, 293, 479, 489
See application file for complete search history.

(56) References Cited

U.S. PATENT DOCUMENTS

| 3,398,035 | A | * | 8/1968 | Cleereman et al. ..... 156/244.24 |
| 4,367,185 | A | * | 1/1983 | Nojiri et al. ................. 264/416 |
| 2002/0121730 | A1 | * | 9/2002 | Ohlinger et al. ............. 264/485 |

FOREIGN PATENT DOCUMENTS

| DE | 19618393 | | 11/1996 |
| EP | 0106354 | | 4/1984 |
| EP | 0650828 | | 4/1999 |
| EP | 0968806 | | 1/2000 |
| EP | 0730947 | | 8/2001 |
| GB | 2022510 | * | 5/1979 |

* cited by examiner

*Primary Examiner*—Justin Fischer
(74) *Attorney, Agent, or Firm*—Darby & Darby P.C.

(57) ABSTRACT

A textured, layered mold-formed body is produced with a foil laminate in which a top foil of at most partially crosslinked polymer materials and a sub-foil containing a polymer foam material with a density between 35 and 120 grams per liter and a gel content of less than 80 percent are laminated together. The foil laminate is embossed with a texture and treated with electron beams to give the texture enough stability for a subsequent deep-drawing step in which the mold-formed body is produced.

24 Claims, No Drawings

METHOD OF PRODUCING TEXTURED MOLD-FORMED BODIES, AND MOLD-FORMED BODIES MANUFACTURED ACCORDING TO THE METHOD

BACKGROUND OF THE INVENTION

The invention relates to a method of manufacturing a textured, multi-layered, mold-formed body, with a top foil containing partially crosslinked polymer materials based in particular on polyolefins and in some cases containing further additives, and with at least one sub-foil laminated to the top foil, wherein the foil laminate is embossed with a texture and then treated with electron beams to stabilize the texture sufficiently for a deep-drawing process, and wherein the treated foil laminate is deep-drawn to produce a textured, multi-layered, mold-formed body.

The invention further relates to a method of manufacturing a textured mold-formed body with a plurality of layers, with a top foil that contains partially crosslinked polymer materials based in particular on polyolefins and in some cases contains further additives, and with at least one sub-foil laminated to the top foil, wherein the foil laminate is treated with electron beams and the treated textured foil laminate is processed further into a mold-formed body.

Furthermore, the invention also relates to carrier-supported, textured, mold-formed bodies with a plurality of layers that are made in the manner described above, and it also relates to the use of the mold-formed bodies for the interior linings of motor vehicles.

In the fields of automotive technology and of technical foil products there has been a strong tendency over a number of years to replace the widely used PVC materials with halogen-free substances. Polyolefins represent a widely used class of materials that can serve as substitutes for PVC materials in automobile interiors. With suitable polymerization techniques, a wide variety of material property profiles are achievable in polyolefins. For example with specifically targeted polymerization processes it is possible to produce extremely rigid high-crystalline polypropylene types that remain stable under temperatures up to 150° C. On the other hand, by copolymerizing the propylene with other monomers it is also possible to synthesize rubber-like polypropylenes, albeit with a totally inadequate shape stability.

The European Patent EP 01 106 354 deals with decorative foils on polyolefin basis for applications in automobile interiors. Critically important factors in this field include stability of the texture, homogeneity of the texture after the forming process, haptics (tactile feel), freedom from aging effects, colorfastness, emissions and the like. A method is described in EP 01 106 354 for the manufacture of a textured mold-formed body containing partially crosslinked polyolefins and in some cases further additives. In a first stage, a foil is produced from non-crosslinked polyolefins and in some cases further additives. This foil is embossed and then treated with electron beams in order to achieve an adequate stability of the texture for a deep-drawing process. The treated foil is subsequently deep-drawn to produce a mold-formed body with a textured surface. Also mentioned in EP 01 106 354 is the possibility to laminate the foil in its irradiated or non-irradiated condition to produce a laminar compound. The foil according to this known state of the art is distinguished by the fact that the electron-beam irradiation after the embossing has a desirable crosslinking effect which results in a highly stable texture after the deep-drawing process. The laminated foil of this known state of the art is particularly important for automobile interiors.

There is a notable trend in the automotive supplier industry to also use so-called direct-laminating processes in an effort to gain efficiency in the production of parts for automobile interiors. The term direct-laminating refers in general to processes in which the lining part is produced in a single process step from a decorative foil and a carrier material without an adhesive system. Examples of these techniques are the press-laminating process, the fused deposition modeling process, or the in-mold decoration process. Processes of this type are described for example in EP 0 968 806 A1, EP 0 730 947 B1, EP 0 650 828 B1, as well as DE 196 18 393 A1.

Unlike the standard deep-drawing processes used in the manufacture of surface decor parts for automobile interiors, some of the direct-laminating processes are distinguished by the fact that the step of shaping the part simultaneously includes the formation of the carrier part over the backside of the foil. In the customary deep-drawing process, the three-dimensionally preformed carrier is press-formed or extruded with the desired contour shape in a preceding separate production step. The carrier is subsequently coated with an adhesive. In the deep-drawing process, the adhesive reacts with an adhesion-promoting lacquer that has been applied to the backside of the foil. In order to ensure the activation of the adhesive, it is in some cases necessary to raise the temperature above a defined activation temperature of the adhesive.

In the direct-laminating process, the carrier material is preheated to a certain temperature and placed into the forming tool together with the foil. The carrier-supported textured mold-formed body is produced in a press-forming operation in which the decorative foil as well as the carrier receive their desired three-dimensional shape. This saves in many cases the separate steps of producing the carrier as well as applying the adhesive. Also, it is no longer necessary to apply the adhesion-promoting lacquer to the backside of the foil. Also, because of the mutually matched combination of decorative foil material and carrier material, the direct-laminating process avoids the problem of a weakening of the adhesive which occurs occasionally, particularly after a certain aging period, and which can lead to rejected production parts due to a partial peeling of the foil from the carrier. It is normally a special trait of the forming operations according to the direct-laminating principle that, unlike in the deep-drawing process, the face side of the decorative material that enters into the forming process does not necessarily have to be heated separately in the final shaping stage. A problem that can occur with foils of conventional composition as used in deep-drawing applications is associated with the low process temperatures on the face side of the decorative foil, as portions of the decorative foil that were subjected to a higher degree of stretching in the forming process may afterwards exhibit white or gray areas that are known as "white breaks". In an attempt to avoid the symptom of white breaks, soft components are normally added to the formulation of the base material for the foil. However, this reduces the shape stability in hot environments, the abrasion resistance, and the stability of the texture after the shaping operation.

In order to achieve a pleasing tactile feel or a desired haptic property in decorative foils, a foam is often applied to the backside of the foil. In addition to the improved haptic properties that can thereby be achieved, the foam simultaneously takes on a protective function for the decorative foil in direct-laminating processes as a shield against the carrier material that is pressed onto the backside of the foil. Therefore, the foam that is used in these processes also needs to have a sufficient thermal and mechanical stability so that it will not collapse over large surface areas when it comes into contact with the carrier material which may have been heated up to 240° C. If this kind of collapse occurs, there is a significantly greater risk that the carrier material escapes through the top foil or that the texture is flattened to an unacceptably high degree.

The materials used in polyolefinic decorative foils are primarily polyolefin foams based on polyethylene and/or polypropylene. In their manufacturing process, these foams are normally crosslinked by means of electron beams. Polypropylene in particular, but also polyethylene, have a known tendency to decompose under the influence of electron beams. The extent of the decomposition increases with a larger dose of radiation. Therefore, if the use of a crosslinking treatment by electron-beam irradiation is being considered after the embossing in order to improve the stability of the texture of the top foil of a foil laminate, one has to assume that this will negatively affect the mechanical properties of the foam because of the decomposition of the polymers. At the same time, the foam will lose some of its protective function for the decorative foil.

OBJECT OF THE INVENTION

In view of the state of the art described above, the invention has the objective to propose a further development of the existing technology, using in particular a foam laminate as the base material, to arrive at a product which, when supported on a carrier, is optimally suited for interior linings of automobiles. In particular, the carrier-supported, textured and layered mold-formed body used in this application needs to have a satisfactory stability of the surface texture and be free from the blemishes known as white breaks. Further, a technical solution is to be proposed for advancing the existing state of the art in a way that avoids the problem of harming the mechanical foam properties which occurs when using a foam laminate and manifests itself in particular through ripping and through brittleness of the foam foil.

SUMMARY OF THE INVENTION

A solution is brought to this problem by a method for the manufacture of a textured, layered mold-formed body with a top foil containing partially crosslinked polymer materials based in particular on polyolefins and in some cases containing further additives, and with at least one sub-foil that is laminated onto the top foil. The foil laminate with a plurality of layers is embossed with a texture and subsequently subjected to an electron beam treatment in order to achieve a sufficient stability of the texture to allow the product to undergo a deep-drawing process. The treated foil laminate with two or more layers is deep-drawn to produce a textured layered mold-formed body in which at least one sub-foil is made with a polymer foam material of a density between about 35 and 120 grams per liter and a gel content of less than 80%, in particular between 30 and 70%.

The foregoing solution of the stated task of the invention will hereinafter be referred to as version A).

The invention calls for the use of polymer base materials that were adjusted beforehand to a favorable gel content or a favorable degree of crosslinking. This means that the process does not necessarily begin with a non-crosslinked polymer base material. It is conceivable, for example, to start with a weakly crosslinked or pre-crosslinked base material with a gel content of, e.g., up to 15%. A low degree of pre-crosslinking is generally advantageous, for example with a gel content of less than about 10%, but in particular less than about 5%.

With preference, the polyolefins used under version A) are characterized in their pre-crosslinking state by a melt flow index MFI (230° C., 2.16 kg) of about 0.1 to 800 g/10 min., in particular about 0.1 to 200 g/10 min, and with special preference about 0.1 to 20 g/10 min.

According to a preferred embodiment, the textured layered mold-formed body is provided with a carrier. Particularly good results are achieved if in the manufacture of the textured, layered mold-formed body the carrier is connected in a deep-drawing process to the textured foil laminate. Preferably, the sub-foil of the foil laminate, which is configured as a foam layer, is connected to the carrier through an adhesive system.

In principle, the range of different polyolefins that can be used in the inventive method is not subject to any limitation. The following are used with preference: polyolefins such as PP, PE, poly(1-butene), poly-isobutylene, poly(4-methyl pentene), PP copolymers or PP terpolymers with $C_2$, $C_4$-$C_{12}$-α-olefins, PE copolymers or PE terpolymers with $C_3$- to $C_{12}$-α-olefins or mixtures thereof, also including (as co- or termonomers) diene monomers containing non-conjugated double bonds such as, e.g., 1,4-hexadiene, 5-methyl-1,5-hexadiene, 5-ethylidene-2-norbonene, 5-butylidene-2-norbonene, dicyclopentadiene, 1,4-octadiene, cyclohexadiene or cyclooctadiene; copolymers of propylene and/or ethylene with polar comonomers such as acrylic acid and/or its $C_1$-$C_{12}$-esters, methacrylic acid and/or its $C_1$-$C_{12}$-esters, ionomers based on acrylic acid and/or with methacrylic acid as well as sulfuric acid, vinyl esters of saturated $C_2$-$C_8$-carbonic acids, optionally with carbon monoxide as termonomer; graft copolymers of propylene and/or ethylene with 8 to 45% grafted units of unsaturated carbonic acids, dicarbonic acids, their esters and/or anhydrides as well as mixtures of the aforementioned polymers. Particularly preferred are polypropylene, polyethylene, polypropylene copolymers or -terpolymers with $C_2$, $C_4$-$C_{12}$-α-olefins and/or polyethylene copolymers or -terpolymers with $C_3$-$C_{12}$-α-olefins.

In a preferred embodiment, polypropylene and/or polyethylene as well as their copolymers and terpolymers polyolefins are used particularly in a non-crosslinked form as a polymer base material.

For the crosslinking, it is preferred to use a crosslinking agent, particularly in the top foil. This applies in particular to polyolefins where the chain break-up that occurs in competition with the crosslinking has a noticeable effect. Subject to this phenomenon are in particular polyolefins with tertiary and quartary C atoms. Crosslinking agents used here include in particular mono-unsaturated and poly-unsaturated compounds such as acrylates of monovalent or higher alcohols such as trimethylol propane triacrylate, methacrylates of monovalent or higher alcohols such as trimethylol propane trimethacrylate, vinyl-functional components such as styrol and divinyl benzol, allyl compounds such as triallyl cyanurate, triallyl isocyanate. Particularly good results are achieved through the use of trimethylol propane triacrylate, trimethylol propane trimethacrylate, triallyl cyanurate, divinyl benzol, ethylene glycol dimethacrylate, diethylene glycol dimethacrylate and/or polyethylene glycol dimethacrylate. It has proven to be advantageous to keep the amount of crosslinking agent used in each foil layer below about 10% by weight, in particular below about 5% by weight.

As a further preferred feature, one or more of the foil layers contain further additives besides the aforementioned crosslinking agents, in particular antioxidants, protective agents against light radiation and against aging, gliding agents and/or pigments, the latter used in particular in an amount of about 10% by weight. For antioxidants, it has proven particularly advantageous to use phenol derivatives, lactones and/or phosphite; and for light-protecting agents, to use sterically blocked amines in an amount below about 5% by weight, preferably no more than 3.5% and in particular 0.2 to 2.5% by weight in relation to the mass of the foil layer.

The crosslinking with electrode beams is performed preferably with a radiation dose of about 20 to 150 KGy, in particular about 30 to 100 KGy. Preferably, according to the invention, this irradiation has the effect that the top foil is brought to a gel content of about 20 to 70%, in particular about 25 to 60%. The Shore hardness D (according to the German industry standard DIN 53505) of the top foil is preferably set at less than about 40, with particular preference at less than about 35.

It has proven advantageous to design the method in such a manner that the textured foil laminate is formed in a single process step in which a foamed sub-foil is laminated to one surface while the top foil is embossed at the same time, with the resulting foil laminate being subsequently exposed to an electron irradiation treatment.

In addition to the version A) of the foregoing description, the invention provides a further solution for the task of manufacturing a textured, layered mold-formed body with a top foil containing partially crosslinked polymer materials based in particular on polyolefins and in some cases containing further additives, and with at least one sub-foil that is laminated onto the top foil, wherein the foil laminate with a plurality of layers is embossed with a texture and subsequently subjected to an electron beam treatment, and wherein the treated textured foil laminate with two or more layers is processed into a mold-formed body. According to the invention, the carrier-supported, textured and layered mold-formed body is produced in a single process step, largely without the use of a vacuum and in particular largely without using an adhesive system, through a procedure, wherein (1) a carrier that has been pre-manufactured in its three-dimensional shape is heated on its surface and pressed onto the heated backside of the irradiated, textured foil laminate; or (2) a base material of the carrier which is at this point in a plastic state is bonded in a tool to the backside of the irradiated, textured foil laminate.

The solution just outlined will hereinafter be referred to as version B).

It has proven advantageous to design the method in such a way that the top foil of the mold-formed body is composed of a) about 5 to 30% by weight of a polypropylene or a mixture of polypropylenes with a melting point of more than 120° C., in particular more than 130° C., wherein the polypropylene or the mixture of polypropylenes contains no more than 20% by weight of a block polymer or homo-polymer, and b) about 70 to 95% by weight of an ethylene copolymer or a mixture of two or more ethylene copolymers with a melting point of less than 110° C., in particular more than 100°, wherein the material of the top foil has a gel content of about 20 to 70%, in particular 30 to 65%. Particularly good results are achieved if the content of block polymers or homo-polymers is less than about 10% by weight, in particular less than about 5% by weight.

In producing the top foil under a preferred embodiment of the invention, an ethylene copolymer is used which contains as comonomers or termonomers acrylic acid, methacrylic acid, sulfuric acid or their ionomers. It has proven advantageous to design the method so that the sub-foil consists of a compact material whose density differs by no more than 10% from the layer above the sub-foil, in particular the top foil. Preferably, the sub-foil is composed of a polyolefin foam that is based in particular on polyethylene and/or polypropylene. The sub-foil can be made up of a multitude of different materials selected for their suitability for the specific technical application. For example, the sub-foil can have a fleece structure. The latter may in some cases represent a particularly preferred choice. The fleece consists preferably of polyethylene and/or polypropylene.

Further preferred are embodiments of the method according to version B) in which the substances used and/or their quantities correspond to those that have already been described above in the preferred embodiments according to version A). As both versions of the method are based on the same inventive concept, the statements made in regard to the preferred embodiments of the method according to version A) are applicable likewise to the method according to version B). In order to avoid repeating the same information, the reader is referred to the respective description of the preferred embodiments of version A).

The invention also relates to a carrier-supported, textured mold-formed body with a top foil based on a crosslinked polymer material, in particular a polyolefin, and in some cases further additives with a gel content of 20 to 70% by weigh, in particular 25 to 60% by weight, with a good stability of the texture as well as a non-glossy surface finish, which is manufactured in accordance with at least one of the methods described hereinabove. The scope of the invention further includes the use of this kind of a carrier-supported, textured mold-formed body with a plurality of layers for interior linings in automobiles.

In conclusion, the advantages that are achievable with the present invention can be summarized as follows, beginning with the method according to version A):

The laminated and textured foils and the composite articles and mold-formed bodies made according to the invention with a foamed sub-foil have a very pleasing tactile feel and softness as required for the interior of an automobile. Furthermore, the inventive method leads to a very high stability of the texture after the deep-drawing process. The window of the process temperature available for the deep-drawing is widened by about 20° C. It has been demonstrated that particularly advantageous properties are obtained in the further processing of the material by the deep-drawing method. In deep-drawing processes of the prior art it happens not infrequently that portions of the deep-drawn foil are disturbed in their homogeneity or are even ripped open. These drawbacks of the prior art have been largely eliminated by the present invention. Finally, the tendency of the surface to take on a reflective sheen is significantly reduced in foils that are made in accordance with the invention.

In addition the foils according to the invention lend themselves well to embossing and laminating.

In regard to version B) of the inventive method, the advantages can be described as follows:

The laminated and textured foils and the composite articles and mold-formed bodies made with them in accordance with version B) of the inventive method are distinguished in particular by their suitability for interior cover linings of automobiles, in particular for dash boards and door panels, where a soft tactile feel is required in addition to a high stability of the texture. Especially in manufacturing processes that require low process temperatures on the face side which are below 120° C., preferably below 120° C., the foils according to the invention have the special advantage that they will not become blemished by so-called white breaks. Furthermore, the foils or the mold-formed bodies according to a preferred embodiment are designed so that after the completed crosslinking step the foam-structured sub-foil remains sufficiently flexible to meet the customer requirement for resistance to impact forces. Further according to a preferred embodiment, actual foil formulations that have been conceived for the method of version B) have noticeably improved abrasion properties while the occurrence of white breaks is likewise eliminated and a very good result is achieved in regard to the depth and homogeneity of the texture.

The invention will hereinafter be explained in further detail based on examples.

EXAMPLES 1 TO 3, AND COMPARISON EXAMPLES 1 TO 3

Methods for Determining the Physical Properties

Determination of Gel Content:

The gel content data were obtained with the extraction method according to the following description: The samples with a thickness of about 0.5 mm are cut into squares of about 1×1 mm$^2$. The samples (about 100 mg) are then put into test tubes with a stopper of stainless steel barbed wire that prevents the samples from floating to the surface. The test tubes are filled with 100 milliliters of xylol and sealed with an aluminum foil in order to prevent the evaporation of the solvent. Next, the xylol is heated to the boiling point. The sample pieces are left in the boiling xylol for about 24 hours. Subsequently, the gel/xylol mixture is filtered through a sieve drum with a mesh width of 200 μm whereby the gel is retained inside the sieve drum. The sieve drums are placed on metal plates and dried for 3 hours at 140° C. in a convection oven. After cooling down to room temperature, the content is weighed and stated as a ratio of the initial sample weight.

Determination of Scratch Resistance:

In this test, a wheel with a diameter of 8 mm, a thickness of 1 mm, and a Shore hardness D of 85 is moved at a speed of 20 cm/sec along a distance of at least 20 cm pushing against the sample with a force of 25 N. The foil may show only a weak imprint, and an irreversible damage of the foil is not allowable in this test.

Determination of Shore Hardness:

See German Industry Standard DIN 53505

Determination of Low-Temperature Resistance:

In accordance with the ball impact method (VDA237-101 Appendix 3), the low-temperature resistance is measured as follows: After storing the foil for 22 hours at −35° C., a ball with a mass of 500 grams is dropped on the foil from a height of 230 mm. There may be no damage to the compact top foil nor to the foamed sub-foil.

High-Temperature Storage Test According to DIN 53377:

Samples of 100×100 mm$^2$ are stored at 120° C. for 24 hours. The test criterion is whether and how much the sample surface has changed in regard to surface gloss and appearance of the texture.

Determination of Deep-Drawing Properties:

The embossed laminated foil compound is placed in a deep-drawing machine and deep-drawn at the stated temperatures over a small roof-shaped mold. The body formed in this test is judged with regard to gloss and the appearance of the texture.

Determination of Cold-Forming Compatibility:

The embossed laminated foil compound under test is pulled at room temperature over a mandrel and inspected for white or gray discolorations appearing on the surface during the test.

Fabrication of the Samples

The compositions formulated in the following Table 1 were extruded on a dual auger extruder (ZSK 25 4D 28) into foils with a thickness of 0.5 mm. The cylinder- and jet temperatures were set according to the data in Table 2.

TABLE 1

| | (composition of foils) | | | | | |
|---|---|---|---|---|---|---|
| Sample Material* | Comparison Example 1 | Comparison Example 2 | Comparison Example 3 | Example 1 | Example 2 | Example 3 |
| TPE-V 1 | 30 | | 15 | | | |
| TPE-V 2 | 30 | 35 | 60 | | | |
| r-PP | 10 | 25 | | 30 | 20 | |
| LLDPE | 10 | 15 | 25 | 20 | 20 | |
| VLDPE | 20 | 25 | | 20 | 20 | 25 |
| EPDM | | | | 30 | 30 | |
| ECOPO | | | | | 10 | |
| Pigment | 1 | 1 | 1 | 1 | 1 | 1 |
| Co-crosslinker | | | | | 0.5 | |
| TPO | | | | | | 75 |

*See Table 5, "Description of Sample Materials"

TABLE 2

| (cylinder- and jet temperatures used for foil extrusion, in ° C.) | | | | | | |
|---|---|---|---|---|---|---|
| | Zone 1 | Zone 2 | Zone 3 | Zone 4 | Zone 5 | Zone 6 |
| cylinder | 180 | 175 | 180 | 195 | 205 | — |
| jet | 210 | 210 | 210 | 210 | 210 | 210 |

The foils are subsequently coated with a layer of about 10 μm of a PUR lacquer. In a next stage which includes embossing in a press at 200° C. and under a pressure of 10 bar, the foils are overlaid with a polypropylene deep-drawing foam (density 67 g/l, thickness 2.0 mm). The press operation extends over a time interval of about 2 minutes.

The specimens prepared by the foregoing process for examples 1 to 3 of the evaluation test are subsequently irradiated with the doses listed in Table 3 by means of an electron beam crosslinker, while the comparison examples 1 to 3 are not irradiated.

TABLE 3

(Irradiation doses)

| | Comparison Example 1 | Comparison Example 2 | Comparison Example 3 | Example 1 | Example 2 | Example 3 |
|---|---|---|---|---|---|---|
| Irradiation dose [kGy] | 0 | 0 | 0 | 100 | 75 | 75 |

The test results for the comparison examples 1 to 3 and examples 1 to 3 are tabulated in Table 4.

TABLE 4

(Test Results)

| | Comp. Example 1 | Comp. Example 2 | Comp. Example 2 | Example 1 | Example 2 | Example 3 |
|---|---|---|---|---|---|---|
| Shore hardness D | 21 | 38 | 28 | 33 | 40 | 30 |
| Gel content in foil | <5% | <5% | 10% | 35% | 42% | 38% |
| Ball impact test | passed | passed | passed | passed | passed | passed |
| Scratch resistance Erichsen 318 | | | | | | |
| 15 N | failed | passed | not tested | passed | passed | not tested |
| 25 N | failed | failed | not tested | passed | passed | not tested |
| High-temp. storage 24 h, 120° C. | failed (gloss, loss of texture) | passed | passed | passed | passed | passed |
| Deep-drawing $T_{top}$ = 150° C. $T_{back}$ = 200° C. | failed gloss, texture flattened | failed, texture valleys widened | failed, gloss, texture flattened | sharply defined texture, no gloss | sharply defined texture, no gloss | sharply defined texture, no gloss |
| Cold-forming | passed | failed, white breaks | not tested | passed | passed | not tested |

Discussion of Test Results

Comparison examples 1 and 2 as well as examples 1 and 2 relate to version B) of the inventive method, while comparison example 3 and example 3 relate to version A).

Comparison example 1 relates to an embossed, layered foil with a foam sub-foil, which is suitable for the direct-laminating process. It is distinguished in particular by its good cold-forming properties (no white breaks) but shows considerable weaknesses in the high-temperature storage test at 120° C. and in the abrasion-resistance test.

Comparison example 2 relates to an embossed, layered foil with a foam sub-foil which, in contrast to comparison example 1, has noticeably better abrasion properties but shows inadequate cold-forming properties. The latter drawback manifests itself in white breaks which occur when the material is cold-formed at room temperature.

Examples 1 and 2, which conform to the inventive method, show a combination of favorable test results, i.e., very good cold-forming properties, favorable deep-drawing properties, favorable high-temperature storage properties, and improved scratch resistance.

Comparison example 3 relates to an embossed, layered foil with a foam sub-foil. Its weakness lies in an inadequate stability of the texture.

Example 3, which conforms to the inventive method, relates to an embossed, layered foil with a foam sub-foil. In contrast to comparison example 3, the test results for example 3 show a very good stability of the texture after the deep-drawing process.

TABLE 5

| | Description of Sample Materials |
|---|---|
| TPE-V 1 | Thermoplastic elastomer, Shore hardness A 50, MFI 22 g/10 min (230° C., 10 kg) |
| TPE-V 2 | Thermoplastic elastomer, Shore hardness A 82, MFI 15 g/10 min (230° C., 10 kg) |
| r-PP | Random co-polymeric polypropylene, density 0.90 g/ml, MFI 1 g/10 min (230° C., 2.16 kg) |
| LLDPE | Linear low-density polyethylene, density 0.92 g/ml, MFI 1 g/10 min (190° C., 2.16 kg) |
| VLDPE | Very low density polyethylene, density 0.87 g/ml, MFI 1 g/10 min (190° C., 2.16 kg) |
| EPDM | Ethylene-propylene-diene polymer mixture, density 0.89 g/ml, diene content approx. 1% by weight |
| ECOPO | Ethylene copolymer, density 0.94 g/ml, acrylic acid content approx. 9% by wt., MFI 1.5 g/10 min (190° C., 2.16 kg) |
| Pigment | Soot |
| Co-crosslinker | Triallyl cyanurate |
| TPO | Thermoplastic elastomer (non-crosslinked), Density 0.89 g/ml, MFI 1 g/10 min (230° C., 2.16 kg) |

What is claimed is:

1. A method of producing a textured, layered mold-formed body with a foil laminate, wherein the method comprises:
   providing a top foil comprising at least one polymer material in a no more than partially crosslinked state;
   providing at least one sub-foil comprising a polymer foam material in a no more than partially crosslinked state;
   laminating the at least one sub-foil onto the top foil and thereby producing said foil laminate and simultaneously embossing the top foil and thereby providing a foil laminate with the texture;
   treating the textured foil laminate with an electron beam to promote crosslinking and wherein said crosslinking treatment is performed with a radiation dose of substantially 20 KGy to 150 KGy to provid a requisite stability to said texture for a subsequent deep-drawing step and to achieve in the top foil material a gel content of 20 to 70% and in the sub-foil material a gel content of 30 to 70% and a density between 35 grams per liter and 120 grams per liter; and
   deep-drawing the radiated foil laminate and thereby producing said textured, layered mold-formed body.

2. The method of claim 1, wherein the polymer materials of the top foil are based on polyolefins.

3. The method of claim 2, wherein said at most partially cross-linked state includes a non-cross linked state, and wherein the polyolefins comprise at least one of polypropylene, polyethylene, including copolymers and terpolymers of polypropylene and polyethylene.

4. The method of claim 3, wherein the top foil consists of one of the compositions a) and b), with
   composition a) comprising substantially 5% to 30% by weight of at least one polypropylene with a melting point above 120° C., wherein the at least one polypropylene contains no more than 20% by weight of one of a block polymer and a homopolymer; and
   composition b) comprising substantially 70% to 95% by weight of at least one ethylene copolymer with a melting point below 110° C., wherein the material of the top foil has a gel content of substantially 20% to 70%.

5. The method of claim 4, wherein the at least one polypropylene contains less than 10% by weight of one of block polymers and homopolymers.

6. The method of claim 5, wherein the at least one polypropylene contains less than 5% by weight of one of block polymers and homopolymers.

7. The method of claim 4, wherein the at least one ethylene copolymer used as co-monomer or ter-monomer contains one of acrylic acid, methacrylic acid, sulfuric acid or their ionomers.

8. The method of claim 1, wherein said top foil comprises further additives.

9. The method of claim 8, wherein said further additives comprise at least one of the group consisting of antioxidants, protective agents against light radiation, protective agents against aging, gliding agents, and pigments in an amount that is substantially no larger 10% of the weight of the top foil.

10. The method of claim 9, wherein said antioxidants comprise at least one of the group consisting of phenol derivatives, lactones, and phosphate; and wherein said protective agents against light radiation comprise sterically blocked amines in an amount below about 5% by weight.

11. The method of claim 1, wherein the textured, layered mold-formed body is provided with a carrier.

12. The method of claim 11, wherein the deep-drawing step includes bonding the carrier to the textured foil laminate.

13. The method of claim 12, wherein said bonding comprises joining the carrier to the sub-foil by means of an adhesive system.

14. The method of claim 1, wherein the sub-foil comprises a compact material whose density differs by no more than 10 percent from the top foil.

15. The method of claim 1, wherein the polymer foam material of the sub-foil comprises one of a polyolefin foam and a fleece.

16. The method of claim 15, wherein said one of a polyolefin foam and a fleece comprises one of polyethylene and polypropylene.

17. The method of claim 1, wherein said polymer materials are crosslinked by using a crossliniking agent.

18. The method of claim 17, wherein said crosslinking agent comprises at least one of the group consisting of trimethylol propane triacrylate, trimethylol propane trimethacrylate, triallyl cyanurate, divinyl benzol, ethylene glycol dimethacrylate, diethylene glycol dimethacrylate, and polyethylene glycol dimethacrylate.

19. The method of claim 17, wherein said crosslinking agent is used in an amount that is substantially no larger than 10% of the weight of the crosslinked polymer materials.

20. The method of claim 19, wherein said crosslinking agent is used in an amount that is less than 5% of the weight of the crosslinked polymer materials.

21. The method of claim 1, wherein said radiation dose is substantially between 30 KGy to 100 KGy.

22. The method of claim 1, wherein said gel content is substantially between 25% and 60% by weight.

23. The method of claim 1, wherein said crosslinking treatment brings the top foil to a Shore hardness D that is substantially no larger than 40.

24. The method of claim 23, wherein said Shore hardness D is less than 35.

* * * * *